(12) United States Patent
Perego et al.

(10) Patent No.: US 11,158,437 B2
(45) Date of Patent: Oct. 26, 2021

(54) ELECTRIC CABLE HAVING IMPROVED THERMAL CONDUCTIVITY

(71) Applicant: NEXANS, Courbevoie (FR)

(72) Inventors: Gabriele Perego, Milan (IT); Christelle Mazel, Ruy (FR); Dimitri Charrier, Ecully (FR); Daphné Merle, Lyons (FR)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 16/493,529

(22) PCT Filed: Mar. 16, 2018

(86) PCT No.: PCT/FR2018/050648
§ 371 (c)(1),
(2) Date: Sep. 12, 2019

(87) PCT Pub. No.: WO2018/167442
PCT Pub. Date: Sep. 20, 2018

(65) Prior Publication Data
US 2020/0005961 A1    Jan. 2, 2020

(30) Foreign Application Priority Data

Mar. 17, 2017 (FR) ..................... 17 52201

(51) Int. Cl.
*H01B 3/44* (2006.01)
*B29C 48/154* (2019.01)
*C08F 210/06* (2006.01)
*C08K 3/26* (2006.01)
*C08K 3/34* (2006.01)
(Continued)

(52) U.S. Cl.
CPC ........... *H01B 3/441* (2013.01); *B29C 48/154* (2019.02); *C08F 210/06* (2013.01); *C08K 3/26* (2013.01); *C08K 3/346* (2013.01); *C08K 5/132* (2013.01); *C08K 13/02* (2013.01); *H01B 3/22* (2013.01); *H01B 7/292* (2013.01); *H01B 13/148* (2013.01); *B29K 2995/0005* (2013.01);
(Continued)

(58) Field of Classification Search
CPC ...... H01B 3/441; H01B 7/292; H01B 13/148; B29K 2995/0005; B29K 2995/0007; B29L 2031/3462; C08F 2800/20
USPC .......................................................... 174/24
See application file for complete search history.

(56) References Cited

U.S. PATENT DOCUMENTS 4,153,587 A * 5/1979 Yui .................. C08L 23/10
524/505
4,348,459 A  9/1982 Drzal et al.
(Continued)

FOREIGN PATENT DOCUMENTS

EP     0 110 677    6/1984
WO    2014/029447    2/2014

OTHER PUBLICATIONS

International Search Report dated May 29, 2018.

*Primary Examiner* — Sherman Ng
(74) *Attorney, Agent, or Firm* — Sofer & Haroun, LLP

(57) ABSTRACT

The invention relates to a cable comprising at least one electrically insulating layer obtained from a polymer composition comprising at least one polypropylene-based thermoplastic polymer material and at least one inorganic filler chosen from silicates, boron nitride, carbonates, and a mixture thereof, and to a process for preparing said cable.

19 Claims, 1 Drawing Sheet

(51) Int. Cl.
  *C08K 5/132* (2006.01)
  *C08K 13/02* (2006.01)
  *H01B 3/22* (2006.01)
  *H01B 7/29* (2006.01)
  *H01B 13/14* (2006.01)
  *B29L 31/34* (2006.01)

(52) U.S. Cl.
  CPC ............. *B29K 2995/0007* (2013.01); *B29L 2031/3462* (2013.01); *C08F 2800/20* (2013.01); *C08K 2003/265* (2013.01)

(56) References Cited

U.S. PATENT DOCUMENTS

| | | | | |
|---|---|---|---|---|
| 4,480,065 | A * | 10/1984 | Kawai | C08K 3/0033 524/418 |
| 4,806,424 | A | 2/1989 | Schultz | |
| 2006/0128866 | A1* | 6/2006 | Diakoumakos | C08L 83/04 524/445 |
| 2007/0246240 | A1* | 10/2007 | Alexander | C04B 35/66 174/36 |
| 2013/0025909 | A1* | 1/2013 | Perego | H01B 3/22 174/116 |
| 2013/0233604 | A1 | 9/2013 | Perego | |
| 2015/0228376 | A1 | 8/2015 | Ranganathan | |
| 2015/0371735 | A1* | 12/2015 | Iwasaki | C08K 3/34 428/372 |
| 2016/0194489 | A1* | 7/2016 | Ho | C08L 23/20 428/339 |

* cited by examiner

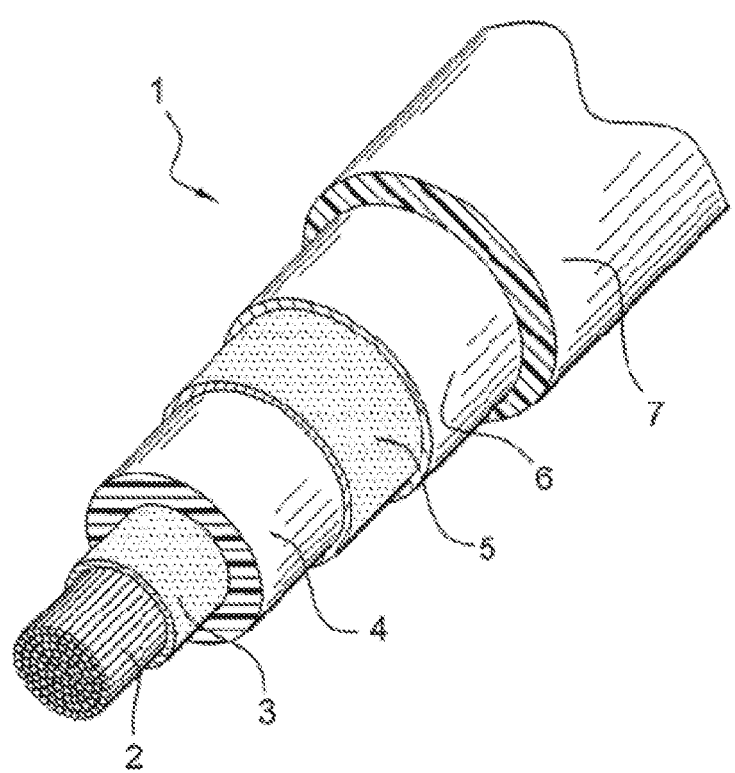

ELECTRIC CABLE HAVING IMPROVED THERMAL CONDUCTIVITY

RELATED APPLICATION

This application is a National Phase of PCT/FR2018/050648 filed on Mar. 16, 2018, which in turn claims priority to French Patent Application No. 17 52201, filed on Mar. 17, 2017, the entirety of which is incorporated by reference.

FIELD OF THE INVENTION

The invention relates to a cable comprising at least one electrically insulating layer obtained from a polymer composition comprising at least one polypropylene-based thermoplastic polymer and at least one inorganic filler chosen from silicates, boron nitride, carbonates and a mixture thereof, and to a process for preparing said cable.

The invention typically but not exclusively applies to electric cables intended for power transmission, in particular to medium-voltage (in particular from 6 to 45-60 kV) or high-voltage (in particular greater than 60 kV, and possibly ranging up to 400 kV) power cables, whether they are direct current or alternating current, in the fields of overhead, undersea or underground electricity transmission, or else of aeronautics.

The invention applies in particular to electric cables having improved thermal conductivity.

DESCRIPTION OF THE RELATED ART

A medium-voltage or high-voltage power transmission cable preferably comprises, from the inside to the outside:
  an elongated electrically conducting element, in particular made of copper or of aluminum;
  an internal semiconducting layer surrounding said elongated electrically conducting element;
  an electrically insulating layer surrounding said internal semiconducting layer;
  an external semiconducting layer surrounding said insulating layer;
  optionally, an electrical shield surrounding said external semiconducting layer, and
  optionally, an electrically insulating protective sheath surrounding said electrical shield.

In particular, the electrically insulating layer may be a polymer layer based on a crosslinked polyolefin, such as a crosslinked polyethylene (XLPE) or a crosslinked ethylene/propylene or ethylene/propylene/diene elastomer (EPDM). The crosslinking is generally carried out during the step of extruding the polymer composition around the elongated electrically conducting element. The use of a crosslinked polyolefin makes it possible to provide a layer which has improved electrical and mechanical properties compared with non-crosslinked LDPE; in particular, cables comprising insulating layers based on XLPE can be used up to temperatures of 90° C., whereas cables comprising an LDPE-based insulating layer can only be used at lower temperatures, not exceeding 70° C. However, XLPEs have a certain number of drawbacks. Firstly, these polymers are not easily recyclable. Secondly, the crosslinking process (vulcanization) for producing a homogeneous layer requires specific reaction conditions (e.g. in terms of time and temperature) which reduce the rate of manufacture of the cable and increase the production cost thereof. Indeed, in order to obtain a satisfactory degree of crosslinking, it is necessary for the polymer to be able to be brought to the temperature required in order to obtain the crosslinking thereof for a sufficiently long period of time. Thus, the rate of production of the cables comprising an XLPE-based electrically insulating layer has to be adjusted so that the passage time in the crosslinking tunnel is long enough to obtain a satisfactory degree of crosslinking, which represents a not insignificant restrictive limit in terms of production capacity. Finally, the crosslinking can sometimes begin prematurely in the extruder (screw, collar) and/or the extruder head, bringing about a formation of particles of degraded XLPE in the extruder (also known as "scorch"), which can subsequently migrate into the electrical insulating layer or into the semiconducting layer of the cable and create defects therein. The presence of particles of degraded XLPE then affects the final properties of the cable insofar as these particles cause a lack of homogeneity, mainly of the material of the electrically insulating layer or else at the interface between the electrically insulating layer and the semiconducting layers. This phenomenon is known as the "scorch phenomenon".

The use of LDPE-based materials for the electrically insulating layers of cables is thus, in principle, an alternative to the use of XLPE-based materials. However, LDPE-based materials have the drawback of not being able to be used at temperatures greater than 70° C., which also has the consequence of reducing their ability to transmit power so as to avoid any overheating of the electrically insulating layer at temperatures greater than 70° C.

Moreover, polypropylene-based materials exhibit good dielectric properties which are, for example, taken advantage of in transformers and in cables, in particular undersea cables comprising an electrically insulating layer based on polypropylene laminated paper (PPLP cables).

On the other hand, in the field of medium-voltage (MV) and high-voltage (HV) cables, the use of polypropylene as material of the electrically insulating layer is not yet very widespread.

Polypropylene is generally characterized by a lower density than that of polyethylene, this lower density being associated with thermal conductivity properties which are slightly inferior to those of polyethylene. Consequently, this represents a drawback when the power cables are MV and HV cables insofar as this decreases the discharge of the heat generated by the Joule effect, and thus the amount of power transmitted, this being a function of the maximum acceptable temperature of the elongated electrically conducting element.

Moreover, international application WO 2015/089179 A1 describes a composition for an electric cable having a thermal conductivity of at least approximately 0.30 W/mK. The composition comprises 100 parts by weight of a polyolefin (e.g. ethylene/butene copolymer), from 10 to 70 parts by weight of a halogenated flame retardant (ethylene bistetrabromophthalimide), from 100 to 200 parts by weight of a non-halogenated flame retardant (metal oxide and/or hydroxide) and from 5 to 35 parts by weight of a synergistic flame retardant (antimony trioxide). However, the electrical and mechanical properties of the composition are not optimized for an application in the HV and MV cable field.

OBJECTS AND SUMMARY

There is therefore still a need for electric cables comprising an electrically insulating layer having electrical properties comparable to those obtained with a crosslinked XLPE layer, in particular in terms of thermal conductivity, while at the same time guaranteeing good mechanical properties.

Thus, the aim of the present invention is to overcome the drawbacks of the prior art and to provide an economical, in particular medium- or high-voltage, cable comprising recyclable materials, which can operate at temperatures greater than 70° C., and which has an improved thermal conductivity, while at the same time guaranteeing good mechanical properties, in particular in terms of elongation at break and force at break.

The aim is achieved by means of the invention which will be described hereinafter.

A first subject of the invention is an electric cable comprising at least one elongated electrically conducting element and at least one electrically insulating layer obtained from a polymer composition comprising at least one polypropylene-based thermoplastic polymer material and at least one inorganic filler, characterized in that the inorganic filler is chosen from silicates, boron nitride, carbonates, and a mixture thereof, and preferably from silicates, carbonates, and a mixture thereof.

The combination of a polypropylene-based thermoplastic polymer material with an inorganic filler chosen from silicates, boron nitride and carbonates makes it possible to obtain an electrically insulating layer having improved thermal conductivity, while at the same time guaranteeing good mechanical properties, in particular in terms of elongation at break and force at break.

Among the silicates as inorganic filler, mention may be made of aluminum, calcium or magnesium silicates.

Aluminum silicates are preferred.

The aluminum silicates can be chosen from kaolins and any other mineral or clay comprising predominantly kaolinite.

In the present invention, the expression "any other mineral or clay comprising predominantly kaolinite" means any other mineral or clay comprising at least approximately 50% by weight, preferably at least approximately 60% by weight, and more preferably at least approximately 70% by weight, of kaolinite, relative to the total weight of the mineral or of the clay.

Kaolins, in particular calcined kaolin, are preferred.

Among the carbonates as inorganic filler, mention may be made of chalk, calcium carbonate (e.g. aragonite, vaterite, calcite or a mixture of at least two of the abovementioned compounds), magnesium carbonate, limestone, or any other mineral comprising predominantly calcium carbonate or magnesium carbonate.

In the present invention, the expression "any other mineral comprising predominantly calcium carbonate or magnesium carbonate" means any other mineral comprising at least approximately 50% by weight, preferably at least approximately 60% by weight, and more preferably at least approximately 70% by weight, of calcium carbonate or of magnesium carbonate, relative to the total mass of the mineral.

Chalk and calcium carbonate are preferred.

According to one particularly preferred embodiment of the invention, the inorganic filler is chosen from kaolins, chalk, and a mixture thereof.

According to one particularly preferred embodiment of the invention, the inorganic filler is chalk.

The inorganic filler preferably represents approximately from 1% to 50% by weight, more preferably approximately from 2% to 40% by weight, and more preferably approximately from 5% to 30% by weight, relative to the total weight of the polymer composition.

The polypropylene-based thermoplastic polymer material may comprise a $P_1$ propylene homopolymer or copolymer, and preferably a $P_1$ propylene copolymer.

The $P_1$ propylene homopolymer preferably has an elastic modulus ranging approximately from 1250 to 1600 MPa.

The $P_1$ propylene homopolymer may represent at least 10% by weight, and preferably from 15 to 30% by weight, relative to the total weight of the polypropylene-based thermoplastic polymer material.

By way of examples of $P_1$ propylene copolymers, mention may be made of copolymers of propylene and of olefin, the olefin being in particular chosen from ethylene and an $\alpha_1$ olefin other than propylene.

The ethylene or the $\alpha_1$ olefin other than propylene of the copolymer of propylene and of olefin preferably represents at most approximately 15 mol %, and more preferably at most approximately 10 mol %, relative to the total number of moles of copolymer of propylene and of olefin.

The $\alpha_1$ olefin other than propylene can correspond to the formula $CH_2=CH-R^1$, in which $R^1$ is a linear or branched alkyl group having from 2 to 12 carbon atoms, in particular chosen from the following olefins: 1-butene, 1-pentene, 4-methyl-1-pentene, 1-hexene, 1-octene, 1-decene, 1-dodecene, and a mixture thereof.

Copolymers of propylene and of ethylene are preferred as $P_1$ propylene copolymer.

The $P_1$ propylene copolymer may be a random propylene copolymer or a heterophasic propylene copolymer, and preferably a heterophasic propylene copolymer.

The polypropylene-based thermoplastic polymer material may comprise several different $P_1$ propylene copolymers, in particular two different $P_1$ propylene copolymers, said $P_1$ propylene copolymers being as defined above.

In particular, the polypropylene-based thermoplastic polymer material may comprise a random propylene copolymer (as first $P_1$ propylene copolymer) and a heterophasic propylene copolymer (as second $P_1$ propylene copolymer). This combination of $P_1$ propylene copolymers makes it possible to improve the mechanical properties of the cross-linked layer.

In the invention, the random $P_1$ propylene copolymer preferably has an elastic modulus ranging approximately from 600 to 1200 MPa.

By way of example of a random propylene copolymer, mention may be made of that sold by the company Borealis under the reference Bormed® RB 845 MO.

The heterophasic $P_1$ propylene copolymer preferably has an elastic modulus ranging approximately from 50 to 250 MPa.

The heterophasic copolymer may comprise a thermoplastic phase of propylene type and a thermoplastic elastomer phase of copolymer of ethylene and of an $\alpha_2$ olefin type.

The $\alpha_2$ olefin of the thermoplastic elastomer phase of the heterophasic copolymer may be propylene.

The thermoplastic elastomer phase of the heterophasic copolymer may represent at least approximately 20% by weight, and preferably at least approximately 45% by weight, relative to the total weight of the heterophasic copolymer.

By way of example of heterophasic copolymer, mention may be made of the heterophasic copolymer sold by the company Basell Polyolefins under the reference Adflex® Q 200 F.

The $P_1$ propylene homopolymer or copolymer may have a melting point greater than approximately 130° C., preferably greater than approximately 140° C., and more preferably ranging approximately from 140 to 170° C.

The $P_1$ propylene homopolymer or copolymer may have an enthalpy of fusion ranging approximately from 20 to 100 J/g.

In particular, the $P_1$ propylene homopolymer has an enthalpy of fusion ranging approximately from 80 to 90 J/g.

The random $P_1$ propylene copolymer may have an enthalpy of fusion ranging approximately from 40 to 80 J/g.

The heterophasic $P_1$ propylene copolymer may have an enthalpy of fusion ranging approximately from 20 to 50 J/g.

The $P_1$ propylene homopolymer or copolymer may have a melt flow index ranging from 0.5 to 3 g/10 min, measured at approximately 230° C. with a load of approximately 2.16 kg according to Standard ASTM D1238-00.

The random $P_1$ propylene copolymer may have a melt flow index ranging from 1.2 to 2.5 g/10 min, measured at approximately 230° C. with a load of approximately 2.16 kg according to Standard ASTM D1238-00.

The heterophasic $P_1$ propylene copolymer may have a melt flow index ranging from 0.5 to 1.5 g/10 min, measured at approximately 230° C. with a load of approximately 2.16 kg according to Standard ASTM D1238-00.

According to one preferred embodiment of the invention, the $P_1$ propylene copolymer, or the $P_1$ propylene copolymers when there are several of them, represent(s) at least approximately 50% by weight, preferably approximately from 55% to 90% by weight, and more preferably approximately from 60% to 90% by weight, relative to the total weight of the polypropylene-based thermoplastic polymer material.

The random propylene copolymer may represent at least 20% by weight, and preferably from 30% to 70% by weight, relative to the total weight of the polypropylene-based thermoplastic polymer material.

The heterophasic $P_1$ propylene copolymer may represent at least 1% by weight, and preferably from 2% to 40% by weight, relative to the total weight of the polypropylene-based thermoplastic polymer material.

The polypropylene-based thermoplastic polymer material may also comprise a $P_2$ olefin homopolymer or copolymer, the olefin being in particular chosen from ethylene and an $\alpha_3$ olefin.

The combination of $P_1$ and $P_2$ polymers makes it possible to obtain a thermoplastic polymer material having good mechanical properties, in particular in terms of elastic modulus, and electrical properties.

The $\alpha_3$ olefin of the $P_2$ olefin homopolymer or copolymer can correspond to the formula $CH_2$=CH—$R^2$, in which $R^2$ is a linear or branched alkyl group having from 1 to 12 carbon atoms, in particular chosen from the following olefins: propylene, 1-butene, isobutylene, 1-pentene, 4-methyl-1-pentene, 1-hexene, 1-octene, 1-decene, 1-dodecene, and a mixture thereof.

The propylene, 1-hexene or 1-octene $\alpha_3$ olefin is particularly preferred.

The $P_2$ olefin homopolymer or copolymer may be a polyethylene.

The polyethylene may be a low-density polyethylene, and preferably a low-density linear polyethylene, in particular according to Standard ISO 1183A (at a temperature of 23° C.). In the present invention, the expression "low-density linear polyethylene" means a linear polyethylene having a density ranging approximately from 0.91 to 0.925, said density being measured according to Standard ISO 1183A (at a temperature of 23° C.).

According to one preferred embodiment of the invention, the $P_2$ olefin homopolymer or copolymer represents approximately from 10% to 50% by weight, and more preferably approximately from 10% to 40% by weight, relative to the total weight of the polypropylene-based thermoplastic polymer material.

According to one particularly preferred embodiment of the invention, the polypropylene-based thermoplastic polymer material comprises two $P_1$ propylene copolymers, such as a random propylene copolymer and a heterophasic propylene copolymer, and a $P_2$ olefin homopolymer or copolymer, such as a polyethylene. This combination of $P_1$ propylene copolymers and of a $P_2$ olefin homopolymer or copolymer makes it possible to further improve the mechanical properties of the crosslinked layer, while at the same time guaranteeing good thermal conductivity.

The thermoplastic polymer material of the polymer composition of the electrically insulating layer of the cable of the invention is preferably heterophasic (i.e. it comprises several phases). The presence of several phases generally originates from the blending of two different polyolefins, such as a blend of polypropylene and of a polypropylene or polyethylene copolymer.

The polymer composition of the invention may also comprise a dielectric liquid, in particular forming an intimate mixture with the thermoplastic polymer material.

By way of examples of dielectric liquid, mention may be made of mineral oils (e.g. naphthenic oils, paraffinic oils or aromatic oils), vegetable oils (e.g. soybean oil, linseed oil, rapeseed oil, maize oil or castor oil) or synthetic oils, such as aromatic hydrocarbons (alkylbenzenes, alkylnaphthalenes, alkylbiphenyls, alkydiarylethylenes, etc), silicone oils, ether oxides, organic esters or aliphatic hydrocarbons.

According to one particular embodiment, the dielectric liquid represents approximately from 1% to 20% by weight, preferably approximately from 2% to 15% by weight, and more preferably approximately from 3% to 12% by weight, relative to the total weight of the thermoplastic polymer material.

The dielectric liquid may comprise a mineral oil and at least one polar compound of the type benzophenone, acetophenone, or a derivative thereof.

In this embodiment, the dielectric liquid may comprise at least approximately 70% by weight of mineral oil, and preferably at least approximately 80% by weight of mineral oil, relative to the total weight of the dielectric liquid.

The mineral oil is generally liquid at approximately 20-25° C.

The mineral oil may be chosen from naphthenic oils and paraffinic oils.

The mineral oil is obtained from the refining of a crude oil.

According to one particularly preferred embodiment of the invention, the mineral oil comprises a content of paraffinic carbon (Cp) ranging approximately from 45 to 65 at. %, a content of naphthenic carbon (Cn) ranging approximately from 35 to 55 at. % and a content of aromatic carbon (Ca) ranging approximately from 0.5 to 10 at. %.

In one particular embodiment, the polar compound of benzophenone or acetophenone type, or a derivative thereof represents at least approximately 2.5% by weight, preferably at least approximately 3.5% by weight, and even more preferentially at least approximately 4% by weight, relative to the total weight of the dielectric liquid.

According to one preferred embodiment of the invention, the polar compound of benzophenone or acetophenone type, or a derivative thereof is chosen from benzophenone, dibenzosuberone, fluorenone and anthrone. Benzophenone is particularly preferred.

The thermoplastic polymer material may also comprise one or more additives.

The additives are well known to those skilled in the art and may be chosen from antioxidants, UV stabilizers, copper scavengers, water-treeing inhibitors, pigments, and a mixture thereof.

The thermoplastic polymer material can typically comprise approximately from 0.01% to 5% by weight, and preferably approximately from 0.1% to 2% by weight of additives, relative to the total weight of the thermoplastic polymer material.

More particularly, the antioxidants make it possible to protect the polymer composition from the thermal stresses generated during the steps of manufacture of the cable or during operation of the cable.

The antioxidants are preferably chosen from hindered phenols, thioesters, sulfur-based antioxidants, phosphorus-based antioxidants, amine-type antioxidants, and a mixture thereof.

By way of examples of hindered phenols, mention may be made of pentaerythritol tetrakis(3-(3,5-di-tert-butyl-4-hydroxyphenyl)propionate) (Irganox® 1010), octadecyl 3-(3,5-di-tert-butyl-4-hydroxyphenyl)propionate (Irganox® 1076), 1,3,5-trimethyl-2,4,6-tris(3,5-di-tert-butyl-4-hydroxybenzyl)benzene (Irganox® 1330), 4,6-bis(octylthiomethyl)-o-cresol (Irgastab® KV10), 2,2'-thiobis(6-tert-butyl-4-methylphenol) (Irganox® 1081), 2,2'-thiodiethylene bis[3-(3,5-di-tert-butyl-4-hydroxyphenyl)propionate] (Irganox® 1035), 2,2'-methylenebis(6-tert-butyl-4-methylphenol), 1,2-bis(3,5-di-ter-butyl-4-hydroxyhydrocinnamoyl)hydrazine (Irganox® MD 1024), or 2,2'-oxamidobis (ethyl 3-(3,5-di-tert-butyl-4-hydroxyphenyl)-propionate).

By way of examples of thioesters, mention may be made of didodecyl 3,3'-thiodipropionate (Irganox® PS800), distearyl thiodipropionate (Irganox® PS802) or 4,6-bis(octylthiomethyl)-o-cresol (Irganox® 1520).

By way of examples of sulfur-based antioxidants, mention may be made of dioctadecyl 3,3'-thiodipropionate or didodecyl 3,3'-thiodipropionate.

By way of examples of phosphorus-based antioxidants, mention may be made of tris(2,4-di-tert-butylphenyl)phosphite (Irgafos® 168) or bis(2,4-di-tert-butylphenyl)pentaerythritol diphosphite (Ultranox® 626).

By way of examples of amine-type antioxidants, mention may be made of phenylenediamines (e.g. 1PPD or 6PPD), diphenylamine styrenes, diphenylamines, mercaptobenzimidazoles and polymerized 2,2,4-trimethyl-1,2-dihydroquinoline (TMQ).

By way of examples of mixtures of antioxidants that can be used according to the invention, mention may be made of Irganox B 225 which comprises an equimolar mixture of Irgafos 168 and Irganox 1010 as described above.

The polymer composition of the electrically insulating layer of the invention is a thermoplastic polymer composition. It is not therefore crosslinkable.

In particular, the polymer composition does not comprise crosslinking agents, coupling agents of silane type, peroxides and/or additives which enable crosslinking. This is because such agents degrade the polypropylene-based thermoplastic polymer material.

The polymer composition is preferably recyclable.

The polymer composition can be prepared by mixing the polypropylene-based thermoplastic polymer material with at least one inorganic filler as defined in the invention, optionally a dielectric liquid and optionally one or more additives.

The electrically insulating layer of the cable of the invention is a non-crosslinked layer or, in other words, a thermoplastic layer.

In the invention, the expression "non-crosslinked layer" or "thermoplastic layer" means a layer, the gel content of which according to Standard ASTM D2765-01 (extraction with xylene) is at most 20%, preferably at most 10%, preferably at most 5%, and particularly preferably 0%.

In one embodiment of the invention, the electrically insulating, preferably non-crosslinked, layer has a thermal conductivity of at least 0.235 W/m·K at 40° C., preferably of at least 0.240 W/m·K at 40° C., more preferably of at least 0.250 W/m·K at 40° C., more preferably of at least 0.280 W/m·K at 40° C., more preferably of at least 0.300 W/m·K at 40° C., and more preferably of at least 0.320 W/m·K at 40° C.

The thermal conductivity is preferably measured according to the method well known under the name "Transient Plane Source" or TPS. Advantageously, the thermal conductivity is measured using an instrument sold under the reference Hot Disk TPS 2500S by the company Thermoconcept.

In one particular embodiment, the electrically insulating, preferably non-crosslinked, layer has a tensile strength (TS) of at least 8.5 MPa, in particular before or after ageing (according to Standard CEI 20-86).

In one particular embodiment, the electrically insulating, preferably non-crosslinked, layer has an elongation at break (EB) of at least 350%, in particular before or after ageing (according to Standard CEI 20-86).

The tensile strength (TS) and the elongation at break (EB) (before or after ageing) can be performed according to Standard NF EN 60811-1-1, in particular using an instrument sold under the reference 3345 by the company Instron.

The electrically insulating layer of the cable of the invention is preferably a recyclable layer.

The electrically insulating layer of the invention may be an extruded layer, in particular extruded by processes well known to those skilled in the art.

The electrically insulating layer has a variable thickness depending on the type of cable envisaged. In particular, when the cable in accordance with the invention is a medium-voltage cable, the thickness of the insulating layer is typically approximately from 4 to 5.5 mm, and more particularly approximately 4.5 mm. When the cable in accordance with the invention is a high-voltage cable, the thickness of the insulating layer typically ranges from 17 to 18 mm (for voltages of about approximately 150 kV) and goes up to thicknesses ranging approximately from 20 to 25 mm for voltages greater than 150 kV (very high-voltage cables). The abovementioned thicknesses depend on the size of the elongated electrically conducting element.

In the present invention, the term "electrically insulating layer" is intended to mean a layer of which the electrical conductivity can be at most $1 \times 10^{-9}$ S/m, and preferably at most $1 \times 10^{-10}$ S/m (siemens per metre) (at approximately 25° C.).

The cable of the invention relates more particularly to the field of electric cables operating by direct current (DC) or by alternating current (AC).

The electrically insulating layer of the invention can surround the elongated electrically conducting element.

The elongated electrically conducting element can be a single-part conductor, such as, for example, a metal wire, or a multipart conductor, such as a plurality of twisted or non-twisted metal wires.

The elongated electrically conducting element can be made of aluminum, of aluminum alloy, of copper, of copper alloy, or of a combination thereof.

According to one preferred embodiment of the invention, the electric cable can comprise:
- a first semiconducting layer surrounding the elongated electrically conducting element,
- an electrically insulating layer surrounding the first semiconducting layer, said electrically insulating layer being as defined in the invention, and
- a second semiconducting layer surrounding the electrically insulating layer.

In the present invention, the term "semiconducting layer" is intended to mean a layer of which the electrical conductivity can be at least $1 \times 10^{-9}$ S/m (siemens per metre), preferably at least $1 \times 10^{-3}$ S/m, and preferably can be less than $1 \times 10^{3}$ S/m (at 25° C.).

In one particular embodiment, the first semiconducting layer, the electrically insulating layer and the second semiconducting layer constitute a three-layer insulation. In other words, the electrically insulating layer is in direct physical contact with the first semiconducting layer, and the second semiconducting layer is in direct physical contact with the electrically insulating layer.

The first and second semiconducting layers are preferably made of a thermoplastic polymer material.

The cable may also comprise an electrically insulating sheath surrounding the second semiconductive layer, and may be in direct physical contact therewith.

The electric cable can also comprise an electrical (e.g. metal) shield surrounding the second semiconducting layer. In this case, the electrically insulating sheath surrounds said electrical shield and the electrical shield is between the electrically insulating sheath and the second semiconducting layer.

This metal shield may be a "wire" shield composed of an assembly of conductors made of copper or aluminum arranged around and along the second semiconducting layer, a "strip" shield composed of one or more conducting metal strips made of copper or aluminum optionally positioned helically around the second semiconducting layer or a conductive metal strip made of aluminum positioned longitudinally around the second semiconducting layer and rendered leaktight by virtue of adhesive in the overlap regions or parts of said strip, or a "leaktight" shield of metal tube type optionally composed of lead or of lead alloy and surrounding the second semiconducting layer. This last type of shield makes it possible in particular to form a barrier to moisture which has a tendency to penetrate radially into the electric cable.

The metal shield of the electric cable of the invention can comprise a "wire" shield and a "leaktight" shield or a "wire" shield and a "strip" shield.

All the types of metal shields can perform the role of earthing the electric cable and can thus transmit fault currents, for example in the event of short-circuit in the network concerned.

Other layers, such as layers which swell in the presence of moisture, can be added between the second semiconducting layer and the metal shield, these layers making it possible to provide the longitudinal watertightness of the electric cable.

A second subject of the invention is an electric cable comprising at least one elongated electrically conducting element and at least one non-crosslinked electrically insulating layer obtained from a polymer composition comprising at least one polypropylene-based thermoplastic polymer material and at least one inorganic filler, characterized in that the non-crosslinked electrically insulating layer has a thermal conductivity of at least 0.235 W/m·K at 40° C., preferably of at least 0.240 W/m·K at 40° C., more preferably of at least 0.250 W/m·K at 40° C., more preferably of at least 0.280 W/m·K at 40° C., more preferably of at least 0.300 W/m·K at 40° C., and more preferably of at least 0.320 W/m·K at 40° C.

The thermal conductivity is preferably measured according to the method well known under the name "Transient Plane Source" or TPS. Advantageously, the thermal conductivity is measured using an instrument sold under the reference Hot Disk TPS 2500S by the company Thermoconcept.

The elongated electrically conducting element, the non-crosslinked electrically insulating layer, the polymer composition, the polypropylene-based thermoplastic polymer material and the inorganic filler can be as defined in the first subject of the invention.

A third subject of the invention is a process for the manufacture of an electric cable in accordance with the first subject or second subject of the invention, characterized in that it comprises at least one step 1) of extruding the polymer composition as defined in the first subject of the invention around an elongated electrically conducting element, so as to obtain an (extruded) electrically insulating layer surrounding said elongated electrically conducting element.

Step 1) can be carried out by techniques well known to those skilled in the art, for example using an extruder.

During step 1), the composition at the outlet of the extruder is termed "non-crosslinked", the temperature and also the time for processing within the extruder consequently being optimized.

At the outlet of the extruder, what is obtained is thus a layer which has been extruded around said electrically conducting element, which may or may not be directly in physical contact with said elongated electrically conducting element.

The process preferably does not comprise a step of crosslinking the layer obtained in step 1).

BRIEF DESCRIPTION OF THE DRAWINGS

FIG. 1 represents a schematic view of an electric cable according to one preferred embodiment in accordance with the invention.

DETAILED DESCRIPTION

For reasons of clarity, only the elements essential for understanding the invention have been schematically represented, with this not being to scale.

The medium- or high-voltage electric cable 1 in accordance with the first subject of the invention, illustrated in FIG. 1, comprises a central elongated electrically conducting element 2, in particular made of copper or of aluminum. The electric cable 1 also comprises several layers placed successively and coaxially around this central elongated electrically conducting element 2, namely: a first semiconducting layer 3 termed "internal semiconducting layer", an electrically insulating layer 4, a second semiconducting layer 5 termed "external semiconducting layer", a metal shield 6 for earthing and/or for protection, and exterior protective sheath 7.

The electrically insulating layer 4 is a non-crosslinked extruded layer obtained from the polymer composition as defined in the invention.

The semiconducting layers 3 and 5 are thermoplastic (i.e. non-crosslinked) extruded layers.

The presence of the metal shield 6 and of the exterior protective sheath 7 is preferential, but not essential, this cable structure being as such well known to those skilled in the art.

EXAMPLES

1. Polymer Compositions

Compositions I1, I2 and I3 in accordance with the invention, i.e. comprising at least one polypropylene-based thermoplastic polymer material and at least chalk as inorganic filler, were compared to comparative compositions C1 and C2, the composition C2 corresponding to a composition for forming a layer of XLPE and the composition C1 corresponding to a composition comprising a polypropylene-based thermoplastic polymer material identical to that used for the compositions of the invention I1, I2 and I3 (C1 thus not comprising an inorganic filler as defined in the invention).

Table 1 below collates polymer compositions of which the amounts of the compounds are expressed in percentages by weight, relative to the total weight of the polymer composition.

TABLE 1

| Polymer compositions | C1 (*) | C2 (*) | I1 | I2 | I3 |
|---|---|---|---|---|---|
| Low-density polyethylene | 0 | 98.1 | 0 | 0 | 0 |
| Heterophasic propylene copolymer | 100 | 0 | 100 | 100 | 100 |
| Peroxide | 0 | 1.6 | 0 | 100 | 100 |
| Dielectric liquid | 6 | 0 | 6 | 6 | 6 |
| Inorganic filler: chalk | 0 | 0 | 11.8 | 26.6 | 45.6 |
| Antioxidant | 0.3 | 0.3 | 0.3 | 0.3 | 0.3 |

(*) Comparative compositions which are not part of the invention

The origin of the compounds of Table 1 is as follows:
low-density linear polyethylene sold by the company Ineos under the reference BPD2000;
heterophasic copolymer sold by the company Basell Polyolefins under the reference Adflex® Q 200F;
dielectric liquid comprising approximately 5.7% by weight of a mineral oil sold by the company Nynas under the reference Nytex 810; and approximately 0.3% by weight of benzophenone sold by the company Sigma-Aldrich under the reference B9300;
antioxidant sold by the company Ciba under the reference Irganox B 225 which comprises an equimolar mixture of Irgafos 168 and Irganox 1010 (for C1, I1 and I2) or sold by the company BASF under the reference Irgastab kV10 (for C2); and
inorganic filler (chalk) sold under the reference Omya EXH1 for chalk.

2. Preparation of the Non-Crosslinked Layers

The compositions collated in Table 1 are used as follows. For the compositions C1, I1, I2 and I3, the dielectric liquid and the antioxidant were mixed with stirring at approximately 75° C., in order to form a dielectric liquid. The dielectric liquid was then mixed with the heterophasic copolymer in a container, then the resulting mixture and the inorganic filler were mixed using a twin-screw extruder (Berstorff twin screw extruder) at a temperature of approximately from 145 to 180° C., then melted at approximately 200° C. (screw speed: 80 revolutions/min). The resulting homogenized and molten mixture was then cooled and formed into granules. The granules were then hot-pressed so as to form layers in the form of plates.

Each of the polymer compositions C1, C2, I1, I2 and I3 were thus prepared in the form of layers 1 mm thick for evaluating their mechanical properties and also in the form of layers 8 mm thick for carrying out thermal conductivity measurements.

These compositions C1, C2, I1, I2 and I3 were then compared from the point of view of their mechanical properties (tensile strength/elongation at break before and after ageing at 135° C. for 240 hours) and of their thermal conductivity.

The tensile strength (TS) and elongation at break (EB) tests were carried out on the materials according to Standard NF EN 60811-1-1, using an instrument sold under the reference 3345 by the company Instron.

The results corresponding to each of these tests are reported in Table 2 (mechanical properties) below:

TABLE 2

| Properties | C1 (*) | C2 (*) | I1 | I2 | I3 |
|---|---|---|---|---|---|
| TS (MPa) | 17.1 | 23.4 | 18.6 | 17.5 | 14.9 |
| EB (%) | 777 | 501.5 | 715 | 683 | 648 |
| TS after ageing (MPa) | 18.4 | 23.7 | 19.1 | 16.4 | 12.9 |
| EB after ageing (%) | 677 | 522.5 | 664 | 634 | 586 |

(*) Comparative compositions which are not part of the invention

All of these results show that the incorporation of an inorganic filler as defined in the invention into a polypropylene matrix is not prejudicial to the mechanical properties of the thermoplastic polymer material that can be used in accordance with the invention as electrically insulating layer of a medium-voltage or high-voltage power cable, said cable retaining very good mechanical properties in terms of tensile strength and of elongation at break, including after ageing (Table 2).

The thermal conductivity tests were carried out on the materials according to the method well known under the term "Transient Plane Source" or TPS and using an instrument sold under the reference Hot Disk TPS 2500S by the company Thermoconcept.

The results corresponding to these tests are reported in Table 3 (thermal conductivity) below:

TABLE 3

| Properties | C1 (*) | I1 | I2 | I3 |
|---|---|---|---|---|
| Conductivity at 40° C. (W/m · K) | 0.229 | 0.243 | 0.263 | 0.305 |

(*) Comparative composition which is not part of the invention

The thermal conductivity results show that the presence of an inorganic filler as defined in the invention in a polypropylene matrix results in an electrically insulating layer having a thermal conductivity greater than that of an electrically insulating layer in which there is no inorganic filler.

The invention claimed is:

1. Electric cable comprising:
   at least one elongated electrically conducting element; and
   at least one electrically insulating layer obtained from a polymer composition comprising at least one polypropylene-based thermoplastic polymer material and at least one inorganic filler,
   wherein the inorganic filler is chosen from silicates, boron nitride, carbonates, and a mixture thereof, and wherein the electrically insulating layer has a thermal conductivity of at least 0.235 W/m·K at 40° C.

2. Cable according to claim 1, wherein the silicates are aluminium silicates chosen from kaolins and any other mineral or clay comprising predominantly kaolinite.

3. Cable according to claim 1, wherein the carbonates are chosen from chalk, calcium carbonate, magnesium carbonate, limestone and any other material comprising predominantly calcium carbonate or magnesium carbonate.

4. Cable according to claim 1, wherein the inorganic filler represents from 2% to 40% by weight, relative to the total weight of the polymer composition.

5. Cable according to claim 1, wherein the inorganic filler is chosen from kaolins, chalk, and a mixture thereof.

6. Cable according to claim 1, wherein the polypropylene-based thermoplastic polymer material comprises a $P_1$ propylene homopolymer or copolymer.

7. Cable according to claim 6, wherein the $P_1$ propylene copolymer is a random propylene copolymer or a heterophasic propylene copolymer.

8. Cable according to claim 7, wherein the heterophasic copolymer comprises a thermoplastic phase of propylene type and a thermoplastic elastomer phase of the type copolymer of ethylene and of an $\alpha_2$ olefin.

9. Cable according to claim 6, wherein the polypropylene-based thermoplastic polymer material comprises a random propylene copolymer and a heterophasic propylene copolymer.

10. Cable according to claim 6, wherein the $P_1$ propylene copolymer(s) represent(s) at least 50% by weight, relative to the total weight of the polypropylene-based thermoplastic polymer material.

11. Cable according to claim 6, wherein the polypropylene-based thermoplastic polymer material also comprises a $P_2$ olefin homopolymer or copolymer, the olefin being chosen from ethylene and an $\alpha_3$ olefin.

12. Cable according to claim 11, wherein the $P_2$ olefin homopolymer or copolymer is a low-density polyethylene.

13. Cable according to claim 11, wherein the $P_2$ olefin homopolymer or copolymer represents from 10% to 50% by weight, relative to the total weight of the polypropylene-based thermoplastic polymer material.

14. Cable according to claim 1, wherein the polymer composition also comprises a dielectric liquid.

15. Cable according to claim 14, wherein the dielectric liquid comprises a mineral oil and at least one polar compound of the type benzophenone, acetophenone, or a derivative thereof.

16. Cable according to claim 1, wherein the electrically insulating layer is a non-crosslinked layer.

17. Process for the manufacture of an electric cable as defined in claim 1, wherein said process comprises:
   at least one step 1) of extruding the polymer composition around an elongated electrically conducting element, so as to obtain an electrically insulating layer surrounding said elongated electrically conducting element.

18. Electric cable comprising:
   at least one elongated electrically conducting element; and
   at least one electrically insulating layer obtained from a polymer composition comprising at least one polypropylene-based thermoplastic polymer material and at least one inorganic filler,
   wherein the inorganic filler is chosen from silicates, boron nitride, carbonates, and a mixture thereof, and wherein the polypropylene-based thermoplastic polymer material comprises:
   a $P_1$ propylene homopolymer or copolymer, and
   a $P_2$ olefin homopolymer or copolymer, the olefin being chosen from ethylene and an $\alpha_3$ olefin.

19. Electric cable comprising:
   at least one elongated electrically conducting element; and
   at least one electrically insulating layer obtained from a polymer composition comprising at least one polypropylene-based thermoplastic polymer material and at least one inorganic filler,
   wherein the inorganic filler is chosen from silicates, boron nitride, carbonates, and a mixture thereof, and
   wherein the polymer composition further comprises a dielectric liquid, said dielectric liquid including a mineral oil and at least one polar compound of the type benzophenone, acetophenone, or a derivative thereof.

* * * * *